United States Patent Office 3,159,663
Patented Dec. 1, 1964

3,159,663
PROCESS FOR PREPARING AMINO-SUBSTITUTED SULFATE ESTERS
Donald L. Klass, Barrington, and John E. King, Evanston, Ill., assignors to The Pure Oil Company, Chicago, Ill., a corporation of Ohio
No Drawing. Filed May 4, 1961, Ser. No. 129,488
14 Claims. (Cl. 260—457)

This invention relates to new and useful improvements in processes for the production of amino-substituted esters of sulfuric acid.

Amino-substituted esters of sulfuric acid and amine salts thereof are known in the art as textile assistants, surface-active agents, detergents, and the like. In Ulrich et al., U.S. Patent 2,063,963, processes are described for the production of amino-substituted esters of sulfuric acid by reaction of hydroxyalkyl or hydroxyaryl amines with a large excess of concentrated sulfuric acid, oleum, sulfur trioxide, or chlorosulfonic acid at about room temperature. The prior art processes, however, suffer from the disadvantage that it is necessary to handle large quantities of highly corrosive sulfuric acid, sulfur trioxide, or chlorosulfonic acid. The prior art processes also suffer from the disadvantage that the only product obtained was the amino-substituted acid ester of sulfuric acid, there being no practical way of producing neutral esters or salts.

It is therefore one object of this invention to provide a new and improved process for the preparation of amine-substituted sulfate esters and amine salts thereof.

Another object of this invention is to provide an improved process for the preparation of amine-substituted sulfate esters and amine salts thereof from ethylene sulfate and its derivatives.

A feature of this invention is the provision of a process in which ethylene sulfate (or alkyl or aryl derivatives thereof) is reacted with a primary or secondary aromatic amine in solution to produce a precipitate of an amine-substituted sulfate ester or amine salt thereof.

Other objects and features of this invention will become apparent from time to time throughout the specification and claims as hereinafter related.

This invention consists of our new and improved method for preparing amine-substituted sulfate esters and amine salts thereof. In our process, ethylene sulfate, or an alkyl or aryl derivative thereof, is dissolved in an inert solvent and treated with one or two equivalents of a primary or secondary aromatic amine. The reaction is carried out preferably at a temperature just below room temperature, e.g. 0°–20° C., although temperatures in the range from −10° to +50° C. may be used. The precipitate which is recovered from solution is an amine-substituted sulfate ester, or the amine salt thereof, depending upon the proportion of aromatic amine used in the reaction and the method of purification. In the reaction of aniline and ethylene sulfate, the product is purified by recrystallization from water to produce the amine salt, and by recrystallization from an alcohol to produce the amine-substituted acid ester.

In carrying out the process of this invention, an inert solvent is used in which both ethylene sulfate and the reactant amine are soluble, but in which the product is insoluble. The inert solvent is defined as one which is unreactive toward either of the reactants or the reaction product. Inert solvents which can be used in this process are characterized by low hydrogen-bonding ability and a solubility parameter in the range from about 9.3 to 10.6. The solubility parameter is a term developed by Hildebrand and discussed in detail, in Hildebrand and Scott, Solubility of Nonelectrolytes, 3rd edition, Reinhold Publishing Corp. (1949). The use of the solubility parameter in prediction of solubility characteristics of various solvents is developed by Burrell in Solubility Parameters for Film Formers, Official Digest, 27, 727–758 (1955). Solvents which fall within the above definition with regard to solubility parameter and hydrogen-bonding ability, and which are inert in the reaction, include the following: chloroform, carbon disulfide, pentachloroethane, chlorobenzene, tetrahydronaphthalene, 1,1,2-trichloroethane, dichloroethyl ether, ethylene dichloride, o-dichlorobenzene, nitrobenzene, 1,2-dibromoethane, dioxane, and α-bromonaphthalene. Additionally, mixtures of solvents can be used which have low hydrogen-bonding ability and a solubility parameter in the aforementioned range, even though the individual solvents in the mixture are not solvents for the reactants in this process. For example, neither carbon tetrachloride nor methylene iodide is a solvent which can be used in this reaction, but a mixture of equal parts by volume of these solvents can be used in this process. Similarly, a mixture of dibromoethane and chloroform is superior as a solvent to either of these solvents alone when used in this process.

We have found that our process functions satisfactorily at temperatures of 0°–20° C., although temperatures in the range from −10° to +50° C. may be used. Within this temperature range, we have found that when ethylene sulfate, or alkyl or aryl derivatives of ethylene sulfate, and a primary or secondary aromatic amine are dissolved and mixed in an inert mutual solvent, the reaction goes to completion within a very few minutes to yield a precipitate containing an amine-substituted ester or an amine salt thereof. The precipitate is recovered by simple filtration and can be further purified by recrystallization from a suitable solvent. In carrying out this process, we have found that amine/ethylene sulfate (or derivatives thereof) molar ratios within the range of 1–2 are satisfactory. A ratio of 1:1 results in an acid salt in accordance with the equation:

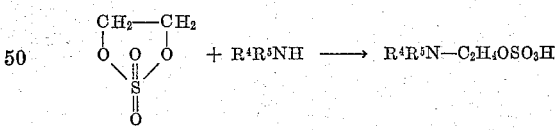

where $R^4$ is aryl and $R^5$ is hydrogen or aryl, which is obtained as a substantially pure product upon recrystallization. When the reaction is carried out using a ratio of two mols (or more) of amine to one mol of ethylene sulfate, the reaction proceeds to the equation:

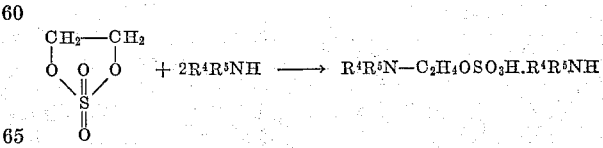

where $R^4$ is aryl and $R^5$ is hydrogen ar aryl. When ratios of amine to ethylene sulfate between one and two are used, a mixture of these products is obtained. When a mol ratio of amine to ethylene sulfate in excess of one is used, the product which is eventually obtained depends upon the method of purification. When the crude precipitate from the aniline-ethylene sulfate reaction is recrystallized from alcohol, the acid ester is obtained. When the crude precipitate from the aniline-ethylene sulfate reaction is recrystallized from water, the aniline salt is obtained. When alkyl- or aryl-substituted derivatives of ethylene sulfate are used in the reaction the corresponding alkyl or aryl derivatives of the final products are obtained as in the above-noted equation.

In carrying out this process, the ethylene sulfate and its derivatives are prepared by reaction of ethylene oxide or derivatives of ethylene oxide with a suitable sulfur trioxide complex, e.g., $SO_3$-dioxane. For example, propylene oxide can be reacted with dioxane-sulfurtrioxide complex to produce propylene sulfate. Butylene sulfate can similarly be obtained from butylene oxide. Aryl derivatives of ethylene oxide can be prepared by similar reactions, e.g., styrene oxide reacts with sulfur trioxide complex to produce styrene sulfate. The cyclic sulfates can also be prepared from cycloalkene oxides such as cyclohexene oxide. The sulfate esters which are used as reactants in this process include ethylene sulfate and derivatives thereof of the formula:

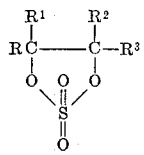

where R, $R^1$, $R^2$ and $R^3$ are hydrogen alkyl and aryl radicals, including bridging cyclic radicals, e.g., methyl, ethyl, propyl, butyl, hexyl, decyl, octadecyl, cyclohexyl, phenyl, naphthyl, anthracyl, etc.

Amines which can be used in this reaction are limited to aromatic amines of the formula:

where $R^4$ is aryl and $R^5$ is hydrogen or aryl, $R^4$ and $R^5$ are selected from the group consisting of phenyl, tolyl, xylyl, ethylphenyl, dodecylphenyl, naphthyl, anthracyl, phenanthryl, and other aromatic radicals. Among the various aromatic amines which can be used in this process are aniline, toluidine, diphenylamine, naphthylamine, dinaphthylamne, anthracylamine, dodecyl aniline, etc.

The following non-limiting examples are illustrative of the scope of this invention.

EXAMPLE I

A 2.46-mol portion of dioxane was dissolved in 100 ml. of 1,2-dichloroethane and treated with 1 mol of sulfur trioxide to form a slurry of dioxane-sulfur-trioxide complex. One mol of ethylene oxide gas was bubbled into the slurry, over a period of one hour and forty minutes, to form a mixture containing ethylene sulfate and an unknown compound of ethylene oxide, sulfur trioxide, and dioxane (probably some kind of dioxonium salt).

Then the mixture was diluted with an additional 200 ml. of 1,2-dichloroethane, and 2 mols of aniline were added while the mixture was stirred and cooled in an ice-bath. A white precipitate formed during the addition of aniline and the subsequent reaction period. The crude precipitate was recovered by filtration and found to have a melting point range of 136°–141° C. This precipitate was recrystallizationed from water and found to have a melting point range of 148°–150° C. The product was analyzed and found to be the aniline salt of N-phenylaminoethyl acid sulfate. The structure of the product was verified by the fact that no precipitate of barium sulfate was formed on treatment with barium chloride solution unless the product was hydrolyzed with acid (thereby establishing the location of the sulfate radical), by infrared analysis, and by elemental analysis. The comparison of theoretical and determined elemental analyses (percent wt.) is as follows.

Theoretical: C, 51.2; H, 6.13; N, 8.52; S, 9.75.
Determined: C, 50.8; H, 6.27; N, 8.34; S, 11.5.

Upon hydrolysis, the product decomposed to N-phenyl ethanolamine, sulfate ion, and aniline, thus providing more evidence in support of the chemical structure of the product.

EXAMPLE II

In another experiment, separate portions of the crude while product produced in Example I were recrystallized from methanol, butanol, isopropanol, and Formula 30 alcohol (denatured ethanol, U.S. denaturant Formula No. 30). In each case, the product obtained was N-phenylaminoethyl acid sulfate,

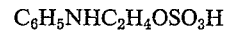

having a melting point in the range of 203°–205° C.

EXAMPLE III

A 105-ml. portion of dioxane was dissolved in 50 ml. of 1,2-dichloroethane and treated with 0.5 mol of sulfur trioxide, added dropwise and with stirring at 0°–5° C. This treatment produced a white complex of dioxane and sulfur trioxide as a slurry in the solvent. The slurry of sulfur-trioxide-dioxane complex was treated with 0.5 mol of ethylene oxide gas added slowly over a period of about one hour at a temperature of 25° C. The solid complex dissolved completely in the solvent when only about one-half of the ethylene oxide had been added. After the addition of ethylene oxide was complete, 1 mol of aniline was added to the solution over a period of 45 minutes, while the solution was stirred and maintained at 25° C. The solution turned pink and a product precipitated as in Example I. The resulting slurry was refrigerated overnight, after which the solid product was recovered by filtration. The product was washed with diethyl ether and dried in air. The crude product thus obtained weighed 109.8 g.

A portion of the product was recrystallized from boiling Formula 30 alcohol and the product obtained was identified as N-phenylaminoethyl acid sulfate, having a melting point of 206°–207° C. The structure of the product was verified by the barium chloride test, by infrared analysis, and by elemental analysis. The elemental analysis (percent wt.) was as follows.

Theoretical: C, 44.2; H, 5.11; N, 6.45; S, 14.8.
Determined: C, 44.4; H, 6.27; N, 6.27; S, 16.5.

Another portion of the crude product was recrystallized from water and the aniline salt of N-phenylaminoethyl acid sulfate, having a melting point of 184°–150° C., was obtained.

EXAMPLE IV

When this process is carried out using other solvents, other aromatic amines, and derivatives of ethylene sulfate, similar products are obtained. When ethylene sulfate (or a derivative thereof) and an aromatic amine are dissolved in an inert mutual solvent, the product precipitates in a relatively short time. When the amine-sulfate mol ratio in the reaction is about 1:1 the product obtained is the acid ester, which can be obtained in a relatively pure form by recrystallization. When the amine-sulfate mol ratio in the reaction is 2:1 or more, the product obtained is the amine salt of the aforementioned acid ester. Purification of the amine salt is accomplished by recrystallization from a suitable solvent, e.g. water. In Table I there is set forth in tabular form the products which are obtained when different amines, sulfates, and solvents are substituted in the process described in the foregoing examples.

Table I

| Amine | Sulfate | Amino/Sulfate, mol ratio | Solvent | Reaction Temp., °C. | Product |
|---|---|---|---|---|---|
| $\phi NH_2$ | Ethylene sulfate | 2 | Chloroform | 0 | Amine salt. |
| $\phi NH_2$ | ----do---- | 2 | ----do---- | 10 | Do. |
| $\phi NH_2$ | ----do---- | 2 | Chlorobenzene | 15 | Do. |
| $CH_3C_6C_4NH_2$ | Butylene sulfate | 1 | 1,2-Dibromoethane | 20 | Acid ester. |
| $C_{10}H_7NH_2$ | Propylene sulfate | 2 | Dichloroethyl ether | 15 | Amine salt. |
| $\phi NH_2$ | Styrene sulfate | 1 | 1,1,2-Trichloroethane | 15 | Acid ester. |
| $\phi NH_2$ | ----do---- | 2 | ----do---- | 10 | Amine salt. |
| $\phi NH_2$ | Cyclohexene sulfate | 2 | 1,2-Dichloroethane | 10 | Do. |
| $\phi NH_2$ | ----do---- | 2 | ----do---- | 0 | Do. |
| $\phi NH_2$ | Ethylene sulfate | 1 | Tetralin | 20 | Do. |
| $\phi NH_2$ | ----do---- | 2 | Nitrobenzene | 20 | Acid ester. |
| $\phi NH_2$ | ----do---- | 2 | Methylene iodide and carbon tetrachloride. | 15 | Amine salt. |
| $\phi NH_2$ | ----do---- | 1 | Carbon disulfide | 15 | Acid ester. |

From the foregoing examples, it is seen that our process is generally applicable to the reaction of ethylene sulfate, or derivatives thereof containing alkyl or aryl substituents (or reaction products of epoxides with a sulfur trioxide-dioxane complex) with primary and secondary aromatic amines in solution in an inert mutual solvent having low hydrogen-bonding ability and a solubility parameter in the range from about 9.3 to 10.6. When the reaction is carried out using at least 1 mol (or more) of aniline per mol of ethylene sulfate (or derivatives thereof), and the crude precipitate is recrystallized from alcohol, the product obtained is an acid ester as in Example II. When the reaction is carried out using 2 or more mols of aniline per mol of ethylene sulfate (or derivatives thereof), a precipitate is obtained from which an aniline salt is obtained upon recrystallization from water, while an acid ester is obtained upon recrystallization from water, while an acid ester is obtained upon recrystallization from alcohol.

The embodiments of the invention in which an exclusive property or privilege is claimed are as follows:

1. A method of preparing amine-substituted sulfate esters which comprises reacting a sulfate ester of the formula

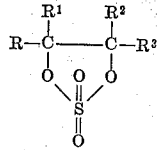

wherein R, R¹, R² and R³ are substituents of the group consisting of hydrogen, methyl, ethyl, propyl, butyl, hexyl, decyl, octadecyl, phenyl, naphthyl, anthracyl, and cyclohexyl formed by the bridging of R¹ and R², with an aromatic amine of the formula

wherein R⁴ is a substituent of the group consisting of phenyl, tolyl, xylyl, ethylphenyl, dodecylphenyl, naphthyl, anthracyl and phenanthryl and R⁵ is a substituent of the group consisting of hydrogen, phenyl, tolyl, xylyl, ethylphenyl, dodecylphenyl, naphthyl, anthracyl and phenanthryl, at a temperature of −10° to +50° C. in an inert mutual solvent characterized by low hydrogen-bonding power and a solubility parameter of about 9.3–10.5, in which the amine-substituted sulfate ester product is insoluble.

2. A method in accordance with claim 1 in which the inert mutual solvent is selected from the group consisting of chloroform, carbon disulfide, pentachloroethane, chlorobenzene, tetrahydronaphthalene, 1,1,2-trichloroethane, dichloroethyl ether, ethylene dichloride, o-dichlorobenzene, nitrobenzene, ethylene dibromide, dioxane, and α-bromonaphthalene.

3. A method in accordance with claim 1 in which the sulfate ester and the aromatic amine are reacted in a mol ratio not less than 1:1 and an acid ester is obtained.

4. A method in accordance with claim 1 in which one mol of the sulfate ester and two mols of the aromatic amine are reacted and an amine salt is obtained.

5. A method in accordance with claim 1 in which the aromatic amine is aniline.

6. A method in accordance with claim 1 in which the aromatic amine is toluidine.

7. A method in accordance with claim 1 in which the aromatic amine is diphenylamine.

8. A method in accordance with claim 1 in which the aromatic amine is naphthylamine.

9. A method in accordance with claim 1 in which the aromatic amine is anthracylamine.

10. A method in accordance with claim 1 in which said sulfate ester is ethylene sulfate.

11. A method in accordance with claim 1 in which said sulfate ester is propylene sulfate.

12. A method in accordance with claim 1 in which said sulfate ester is styrene sulfate.

13. The method which comprises reacting ethylene sulfate with aniline in a 1:1 mol ratio at a temperature of −10° to +50° C. in solution in ethylene dichloride to produce a precipitate from which N-phenylaminoethyl acid sulfate is obtained upon recrystallization from alcoholic solution.

14. The method which comprises reacting one mol of ethylene sulfate with 2 mols of aniline at a temperature of −10° to +50° C. in solution in ethylene dichloride to produce a precipitate from which the aniline salt of N-phenylaminoethyl acid sulfate is obtained by recrystallization from water.

References Cited in the file of this patent

UNITED STATES PATENTS 2,666,788    Ebel  -------------------- June 19, 1954
2,923,728    Falk et al.  -------------------- Feb. 2, 1960

OTHER REFERENCES

Hurd et al.: Jour. Amer. Chem. Soc., vol. 69, pp. 2113–15 (1947).

UNITED STATES PATENT OFFICE
CERTIFICATE OF CORRECTION

Patent No. 3,159,663 December 1, 1964

Donald L. Klass et al.

It is hereby certified that error appears in the above numbered patent requiring correction and that the said Letters Patent should read as corrected below.

Column 3, line 1, for "ar" read -- or --; line 52, for "dinaphthylamne" read -- dinaphthylamine --; line 72, for "recrystallizationed" read -- recrystallized --; column 4, line 17, for "while" read -- white --; line 57, for "184°-150°" read -- 148°-150° --; column 5, lines 36 and 37, strike out "while an acid ester is obtained upon recrystallization from water,".

Signed and sealed this 6th day of April 1965.

(SEAL)
Attest:

ERNEST W. SWIDER
Attesting Officer

EDWARD J. BRENNER
Commissioner of Patents